United States Patent
Ozawa et al.

(10) Patent No.: US 9,984,712 B1
(45) Date of Patent: May 29, 2018

(54) MAGNETIC TAPE DEVICE AND HEAD TRACKING SERVO METHOD

(71) Applicant: FUJIFILM Corporation, Tokyo (JP)

(72) Inventors: Eiki Ozawa, Minami-ashigara (JP); Tetsuya Kaneko, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/854,329

(22) Filed: Dec. 26, 2017

(30) Foreign Application Priority Data

Dec. 27, 2016 (JP) .................................. 2016-254434

(51) Int. Cl.
*G11B 5/706* (2006.01)
*G11B 5/39* (2006.01)
*G11B 5/84* (2006.01)

(52) U.S. Cl.
CPC ............ *G11B 5/706* (2013.01); *G11B 5/3909* (2013.01); *G11B 5/84* (2013.01)

(58) Field of Classification Search
CPC ................. G11B 2005/001–2005/0018; G11B 2005/3996; G11B 5/00813–5/00826; G11B 5/29–5/3116; G11B 5/39–5/3993; G11B 5/62; G11B 5/68–5/738; G11B 5/84–5/858; G11B 2220/95–2220/956
USPC .............................. 360/55, 69, 75, 77.12, 134
See application file for complete search history.

(56) References Cited

U.S. PATENT DOCUMENTS

| | | | | |
|---|---|---|---|---|
| 7,656,602 B2* | 2/2010 | Iben | ..................... | G11B 5/3106 360/66 |
| 8,318,242 B2* | 11/2012 | Bradshaw | .......... | G11B 5/00821 427/127 |
| 9,159,341 B2* | 10/2015 | Bradshaw | .......... | G11B 5/00821 |
| 9,324,343 B2* | 4/2016 | Bradshaw | .......... | G11B 5/00821 |
| 2016/0064025 A1* | 3/2016 | Kurokawa | ............... | G11B 5/71 428/840.4 |
| 2016/0093323 A1* | 3/2016 | Omura | .................... | G11B 5/733 428/840.3 |

FOREIGN PATENT DOCUMENTS

JP 2004-185676 A 7/2004

* cited by examiner

*Primary Examiner* — Wayne Young
*Assistant Examiner* — James L Habermehl
(74) *Attorney, Agent, or Firm* — Sughrue Mion, PLLC

(57) ABSTRACT

The magnetic tape device includes: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes a servo pattern, and a contact angle with respect to 1-bromonaphthalene measured regarding a surface of the magnetic layer is 48.0° to 53.0°.

12 Claims, 2 Drawing Sheets

US 9,984,712 B1

MAGNETIC TAPE DEVICE AND HEAD TRACKING SERVO METHOD

CROSS-REFERENCE TO RELATED APPLICATIONS

This application claims priority under 35 U.S.C. 119 to Japanese Patent Application No. 2016-254434 filed on Dec. 27, 2016. The above application is hereby expressly incorporated by reference, in its entirety, into the present application.

BACKGROUND OF THE INVENTION

1. Field of the Invention

The present invention relates to a magnetic tape device and a head tracking servo method.

2. Description of the Related Art

Magnetic recording is used as a method of recording information in a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head as a reproducing head for reproducing information in the magnetic disk device. On the other hand, the usage of the TMR head as a reproducing head in the magnetic tape device is currently still in a stage where the future usage thereof is expected, and the usage thereof is not yet practically realized.

However, in the magnetic tape, information is normally recorded on a data band of the magnetic tape. Accordingly, data tracks are formed in the data band. As means for realizing high capacity of the magnetic tape, a technology of disposing the larger amount of data tracks in a width direction of the magnetic tape by narrowing the width of the data track to increase recording density is used. However, in a case where the width of the data track is narrowed and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer and performing head tracking servo has been recently proposed and practically used. In a magnetic servo type head tracking servo among head tracking servos, a servo pattern is formed in a magnetic layer of a magnetic tape, and this servo pattern is read by a servo head to perform head tracking servo. The head tracking servo is to control a position of a magnetic head in the magnetic tape device. The head tracking servo is more specifically performed as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure signal-to-noise-ratio (SNR) at the time of reading the servo pattern. As a magnetic head for this, the inventors focused on a TMR head which has been proposed to be used as a reproducing head in the magnetic disk device in JP2004-185676A. As described above, the usage of the TMR head in the magnetic tape device is still in a stage where the future use thereof as a reproducing head for reproducing information is expected, and the usage of the TMR head as the servo head has not even proposed yet. However, the inventors have thought that, it is possible to deal with realization of higher sensitivity of the future magnetic tape, in a case where the TMR head is used as the servo head in the magnetic tape device which performs the head tracking servo.

That is, an object of one aspect of the invention is to provide a magnetic tape device in which a TMR head is mounted as a servo head.

A magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. In a case where the TMR head is used as the servo head, the TMR head detects a change in leakage magnetic field generated from a magnetic layer in which the servo pattern is formed, as a change in resistance value (electric resistance) and reads the servo pattern (reproduces a servo signal) by converting the change in resistance value into a change in voltage. It is said that a resistance value of the TMR head is generally high, as disclosed in a paragraph 0007 of JP2004-185676A, but occurrence of a significant decrease in resistance value in the TMR head may cause a decrease in sensitivity of the TMR head, thereby resulting in a decrease in signal intensity of a servo signal reproduced by the servo head and a decrease in SNR accompanied with that. Accordingly, the accuracy of the head position controlling of the head tracking servo may decrease.

During intensive studies for achieving the object described above, the inventors have found a phenomenon which was not known in the related art, in that, in a case of using the TMR head as a servo head in the magnetic tape device which performs the head tracking servo, a significant decrease in resistance value (electric resistance) occurs in the TMR head. A decrease in resistance value of the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of using the TMR head was not even confirmed in the related art. A difference in the recording and reproducing system between the magnetic disk device and the magnetic tape device, specifically, contact and non-contact between a magnetic recording medium and a magnetic head may be the reason why a significant decrease in resistance value of the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads.

With respect to this, as a result of more intensive studies after finding the phenomenon described above, the inventors have newly found the following points.

It is desired that the magnetic tape is transported at a low speed in the magnetic tape device, in order to prevent a deterioration in recording and reproducing characteristics. But, in a case where the magnetic tape is transported at a low speed which is equal to or lower than a predetermined speed in the magnetic tape device (specifically, in a case where a magnetic tape transportation speed is equal to or lower than 18 m/sec), a decrease in resistance value of the TMR head which reads a servo pattern for performing head tracking servo at the time of recording and/or reproduction of information particularly significantly occurs.

However, such a decrease in resistance value can be prevented by using a magnetic tape described below as the magnetic tape.

One aspect of the invention has been completed based on the finding described above.

That is, according to one aspect of the invention, there is provided a magnetic tape device comprising: a magnetic tape; and a servo head, in which a magnetic tape transportation speed of the magnetic tape device is equal to or lower than 18 m/sec, the servo head is a magnetic head (hereinafter, also referred to as a "TMR head") including a tunnel magnetoresistance effect type element (hereinafter, also referred to as a "TMR element") as a servo pattern reading element, the magnetic tape includes a non-magnetic support, and a magnetic layer including ferromagnetic powder and a binding agent on the non-magnetic support, the magnetic layer includes a servo pattern, and a contact angle with respect to 1-bromonaphthalene measured regarding a surface of the magnetic layer is 48.0° to 53.0°.

According to another aspect of the invention, there is provided a head tracking servo method comprising: reading a servo pattern of a magnetic layer of a magnetic tape by a servo head in a magnetic tape device, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, and a contact angle with respect to 1-bromonaphthalene measured regarding a surface of the magnetic layer is 48.0° to 53.0°.

Hereinafter, the contact angle with respect to 1-bromonaphthalene is also referred to as a 1-bromonaphthalene contact angle. The 1-bromonaphthalene contact angle is a value measured by a liquid droplet method. Specifically, the 1-bromonaphthalene contact angle is an arithmetical mean of values obtained by performing measurement regarding a certain sample six times by a θ/2 method in a measurement environment of an atmosphere temperature of 25° C. and a relative humidity of 25%. An example of a specific aspect of measurement conditions will be described later in Examples.

One aspect of the magnetic tape device and the head tracking servo method is as follows.

In one aspect, the contact angle with respect to 1-bromonaphthalene measured regarding the surface of the magnetic layer is 48.2° to 52.5°.

In one aspect, a center line average surface roughness Ra measured regarding a surface of the magnetic layer is equal to or smaller than 2.8 nm.

In one aspect, the center line average surface roughness Ra is equal to or smaller than 2.5 nm.

In one aspect, the magnetic tape includes a non-magnetic layer including non-magnetic powder and a binding agent between the non-magnetic support and the magnetic layer, and a total thickness of the magnetic layer and the non-magnetic layer is equal to or smaller than 1.8 µm.

In one aspect, the total thickness of the magnetic layer and the non-magnetic layer is equal to or smaller than 1.1 µm.

According to one aspect of the invention, it is possible to prevent occurrence of a significant decrease in resistance value in the TMR head, in a case of reading a servo pattern of the magnetic layer of the magnetic tape which is transported at the magnetic tape transportation speed equal to or lower than 18 m/sec, by the TMR head.

DESCRIPTION OF THE PREFERRED EMBODIMENTS

Magnetic Tape Device

Figure 1:
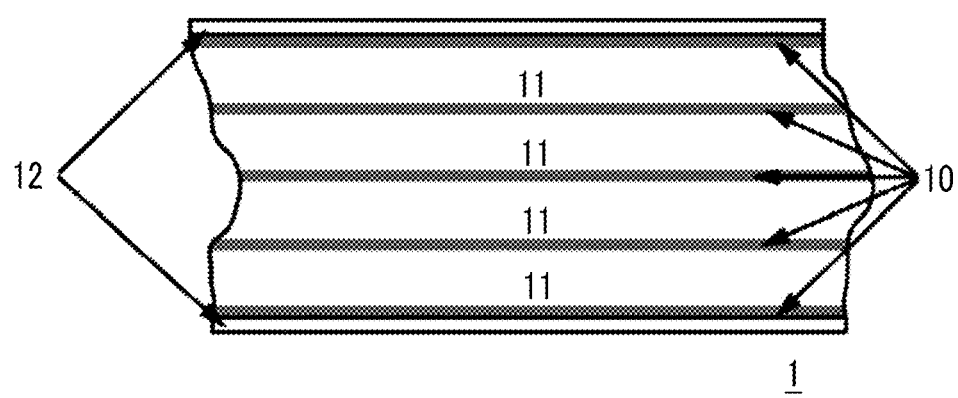
FIG. 1 shows an example of disposition of data bands and servo bands.

One aspect of the invention relates to a magnetic tape device including: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes a servo pattern, and a contact angle with respect to 1-bromonaphthalene measured regarding a surface of the magnetic layer is 48.0° to 53.0°.

The magnetic tape transportation speed of the magnetic tape device is also referred to as a running speed. In the invention and the specification, the "magnetic tape transportation speed" is a relative speed between the magnetic tape transported in the magnetic tape device and the servo head in a case where the servo pattern is read by the servo head. In the magnetic tape device, in a case of using a magnetic tape of the related art, in a case where the TMR head is used as the servo head and the magnetic tape is transported under specific conditions in which the magnetic tape transportation speed is equal to or lower than 18 m/sec, a phenomenon in which a resistance value (electric resistance) significantly decreases occurs in the TMR head used as the servo head. This phenomenon is a phenomenon that is newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reading a servo pattern formed in the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reading a servo pattern formed in the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurring even at one portion between the two electrodes as described above is a phenomenon which does not occur in other MR heads. In the magnetic disk device using a levitation type recording and reproducing system, a magnetic disk and a magnetic head do not come into contact with each other, and thus, damage causing short circuit hardly occurs. On the other hand, in the magnetic tape device using a sliding type recording and reproducing system, in a case where any measures are not prepared, the TMR head is affected and damaged due to the sliding between the TMR head and the magnetic tape, and thus, short circuit easily occurs. Among these, in a case where the transportation speed of the magnetic tape is low, the time for which the same portion of the TMR head comes into contact with the magnetic tape increases at the time of reading a servo pattern by the TMR head, and accordingly, damage more easily occurs. The inventors have assumed that this is the reason why a decrease in resistance value of the TMR head particularly significantly occurs in a case of using the TMR head as the servo head in the magnetic tape device in which the magnetic tape transportation speed is equal to or lower than 18 m/sec.

With respect to this, as a result of intensive studies of the inventors, the inventors have newly found that it is possible to prevent a phenomenon in which a decrease in resistance value of the TMR head used as the servo head particularly significantly occurs in the magnetic tape device in which the magnetic tape transportation speed is equal to or lower than 18 m/sec, by using the magnetic tape which includes the magnetic layer including ferromagnetic powder and a binding agent on the non-magnetic support, and in which the contact angle with respect to 1-bromonaphthalene measured regarding a surface of the magnetic layer (1-bromonaphthalene contact angle) is 48.0° to 53.0°. It is thought that the magnetic tape having the 1-bromonaphthalene contact angle of 48.0° to 53.0° shows suitable affinity with the TMR head, in a case where the magnetic tape comes into contact with the TMR head, and this allows smooth sliding between the magnetic tape and the TMR head. As a result, the inventors have surmised that it is possible to prevent a decrease in resistance value of the TMR head.

However, the above descriptions are merely a surmise of the inventors and the invention is not limited thereto.

Regarding the 1-bromonaphthalene contact angle, JP2016-51493A discloses that the 1-bromonaphthalene contact angle of the magnetic layer is set to be in a specific range in a magnetic recording medium, in order to improve running durability of the magnetic recording medium. However, as described above, the usage of the TMR head as a servo head in the magnetic tape device has not even proposed in the related art. In addition, in the magnetic tape device in which the TMR head is mounted as a servo head, the occurrence of a particularly significant decrease in resistance value of the TMR head at a specific magnetic tape transportation speed (specifically, equal to or lower than 18 m/sec) is a phenomenon which was not known in the related art. With respect to such a phenomenon, the effect of the 1-bromonaphthalene contact angle and a possibility of prevention of the phenomenon by setting the 1-bromonaphthalene contact angle to be 48.0° to 53.0° is not disclosed in JP2016-51493A and is newly found by the inventors as a result of intensive studies.

Hereinafter, the magnetic tape device will be described more specifically. A "decrease in resistance value of the TMR head" described below is a significant decrease in resistance value of the TMR head occurring in a case of reading a servo pattern by using the TMR head as the servo head, in the magnetic tape device having the magnetic tape transportation speed equal to or lower than 18 m/sec, unless otherwise noted.

Magnetic Tape

1-Bromonaphthalene Contact Angle

The 1-bromonaphthalene contact angle measured regarding the surface of the magnetic layer of the magnetic tape is 48.0° to 53.0°. The inventors have considered that, as a value of the 1-bromonaphthalene contact angle is small, affinity between the magnetic tape (specifically, surface of the magnetic layer) and the TMR head is high, and as the value is great, the affinity between the magnetic tape and the TMR head is low. The inventors have surmised that, the surface of the magnetic layer showing the 1-bromonaphthalene contact angle of 48.0° to 53.0° can realize a stable contact state due to suitable affinity with respect to the TMR head in a case of coming into contact with the TMR head, and thus, it is possible to prevent a decrease in resistance value of the TMR head. The 1-bromonaphthalene contact angle measured regarding the surface of the magnetic layer is preferably equal to or greater than 48.2°, more preferably equal to or greater than 49.0°, even more preferably equal to or greater than 48.5°, and still more preferably equal to or greater than 49.5°, from a viewpoint of further preventing a decrease in resistance value of the TMR head. The 1-bromonaphthalene contact angle measured regarding the surface of the magnetic layer is preferably equal to or smaller than 52.8° and more preferably equal to or smaller than 52.5°, from the same viewpoint.

The 1-bromonaphthalene contact angle measured regarding the surface of the magnetic layer can be controlled by using a component capable of adjusting the 1-bromonaphthalene contact angle (hereinafter, also referred to as a "1-bromonaphthalene contact angle adjusting component") and adjusting a content of such a component. For example, a value of the 1-bromonaphthalene contact angle can be increased by using a component which can exhibit an operation of increasing the value of the 1-bromonaphthalene contact angle, as the 1-bromonaphthalene contact angle adjusting component, and increasing the content of the component.

As an example of the 1-bromonaphthalene contact angle adjusting component, a lubricant can be used. In addition, a polymer which will be described later specifically can also be used. For example, by using one or more kinds of 1-bromonaphthalene contact angle adjusting components selected from the group consisting of the lubricant and the polymer which will be described later, it is possible to obtain the magnetic tape in which the 1-bromonaphthalene contact angle measured regarding the surface of the magnetic layer is 48.0° to 53.0°. In one aspect, it is possible to form a magnetic layer by using one or more kinds of lubricants as the 1-bromonaphthalene contact angle adjusting component, without using the polymer which will be described later. In another aspect, it is possible to form a magnetic layer by using one or more kinds of the polymer which will be described later as the 1-bromonaphthalene contact angle adjusting component, without using the lubricant. In still another aspect, it is possible to form a magnetic layer by using both of one or more kinds of lubricants and one or more kinds of the polymer which will be described later as the 1-bromonaphthalene contact angle adjusting component.

1-Bromonaphthalene Contact Angle Adjusting Component

The 1-bromonaphthalene contact angle adjusting component is a component capable of adjusting the 1-bromonaphthalene contact angle measured regarding the surface of the magnetic layer. Hereinafter, the 1-bromonaphthalene contact angle adjusting component is also referred to as a 1-bromonaphthalene contact angle adjusting agent. Here, the expression "capable of adjusting" means an operation of changing the 1-bromonaphthalene contact angle can be exhibited. The exhibiting of such an operation can be confirmed with a change in the 1-bromonaphthalene contact angle measured regarding the surface of the magnetic layer in accordance with presence or absence of the 1-bromonaphthalene contact angle adjusting component. The 1-bromonaphthalene contact angle adjusting component preferably exhibits an operation of increasing a value of the 1-bromonaphthalene contact angle. One aspect of the 1-bromonaphthalene contact angle adjusting component is a lubricant, and another aspect thereof is a polymer which will be described later. Hereinafter, these components will be described in order.

Lubricant

As the lubricant, various lubricants normally used in various magnetic recording media such as fatty acid, fatty acid ester, or fatty acid amide can be used.

As the content of the lubricant included in the magnetic layer is great, a value of the 1-bromonaphthalene contact angle measured regarding the surface of the magnetic layer tends to increase.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid ester, esters of various fatty acids described above, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate can be used.

As fatty acid amide, amide of various fatty acid, for example, lauric acid amide, myristic acid amide, palmitic acid amide, and stearic acid amide can be used.

The content of fatty acid in a magnetic layer forming composition is, for example, 0 to 10.0 parts by mass, is preferably 0.1 to 10.0 parts by mass, more preferably 0.5 to 8.0 parts by mass, and even more preferably 1.0 to 7.0 parts by mass, with respect to 100.0 parts by mass of ferromagnetic powder. In a case of using two or more kinds of different fatty acids as the fatty acid, the content thereof is the total content thereof. The same applies to other components. That is, in the invention and the specification, a given component may be included alone or included in combination of two or more kinds thereof, unless otherwise noted. In a case where two or more kinds of a given component are included, the content of the component is the total content of the two or more kinds of the component, unless otherwise noted.

The content of fatty acid ester is, for example, 0.1 to 10.0 parts by mass, preferably 0.5 to 8.0 parts by mass, and more preferably 1.0 to 7.0 parts by mass with respect to 100.0 parts by mass of ferromagnetic powder, as the content of fatty acid ester in the magnetic layer forming composition.

The content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of ferromagnetic powder.

In a case where the magnetic tape includes a non-magnetic layer between the non-magnetic support and the magnetic layer, the non-magnetic layer may include or may not include a lubricant. At least a part of the lubricant included in the non-magnetic layer can be normally moved to the magnetic layer side and present in the magnetic layer. The content of fatty acid in a non-magnetic layer forming composition is, for example, 0 to 10.0 parts by mass, preferably 1.0 to 10.0 parts by mass, and more preferably 1.0 to 7.0 parts by mass with respect to 100.0 parts by mass of non-magnetic powder. The content of fatty acid ester is, for example, 0 to 10.0 parts by mass and preferably 0.1 to 8.0 parts by mass with respect to 100.0 parts by mass of non-magnetic powder. The content of fatty acid amide in the non-magnetic layer forming composition is, for example, 0 to 3.0 parts by mass and preferably 0 to 1.0 parts by mass with respect to 100.0 parts by mass of non-magnetic powder.

It is preferable that fatty acid and one or more kinds of derivatives of fatty acid are used in combination, it is more preferable that one or more kinds selected from the group consisting of fatty acid ester and fatty acid amide and fatty acid are used in combination, and it is more preferable that fatty acid, fatty acid ester, and fatty acid amide are used in combination.

In a case where fatty acid and a derivative (ester and amide) of fatty acid are used in combination, a part derived from fatty acid of the fatty acid derivative preferably has a structure which is the same as or similar to that of fatty acid used in combination. As an example, in a case of using stearic acid as fatty acid, it is preferable to use stearic acid ester such as butyl stearate and/or stearic acid amide.

As the lubricant, a lubricant disclosed in a paragraph 0111 of JP2009-96798A can be used.

Nitrogen-Containing Polymer

As one aspect of the 1-bromonaphthalene contact angle adjusting component, a nitrogen-containing polymer can be used. It is assumed that a polymer chain included in the nitrogen-containing polymer contributes to an increase in 1-bromonaphthalene contact angle measured regarding the surface of the magnetic layer. The nitrogen-containing polymer is a polymer including nitrogen atoms in a structure. Examples of preferable nitrogen-containing polymer include a polyalkyleneimine-based polymer which is one of amine-based polymer, and an amine-based polymer other than the polyalkyleneimine-based polymer. The polyalkyleneimine-based polymer is a polymer including one or more polyalkyleneimine chains. For details of the polyalkyleneimine-based polymer, descriptions disclosed in paragraphs 0035 to 0077 of JP2016-51493A can be referred to. In addition, for details of the amine-based polymer, descriptions disclosed in paragraphs 0078 to 0080 of JP2016-51493A can be referred to.

In addition, in one aspect, the nitrogen-containing polymer is preferably a polymer in which a weight-average molecular weight is in a range not exceeding a weight-average molecular weight of a binding agent included in the magnetic layer. For example, the weight-average molecular weight of the nitrogen-containing polymer can be equal to or smaller than 80,000, equal to or smaller than 60,000, equal to or smaller than 40,000, equal to or smaller than 35,000, equal to or smaller than 30,000, equal to or smaller than 20,000, or equal to or smaller than 10,000. In addition, the weight-average molecular weight of the nitrogen-containing polymer can be, for example, equal to or greater than 1,000, equal to or greater than 1,500, equal to or greater than 2,000, or equal to or greater than 3,000. The weight-average molecular weight in the invention and the specification is a value obtained by performing polystyrene conversion of a value measured by gel permeation chromatography (GPC), unless otherwise noted. As the measurement conditions, the following conditions can be used. The weight-average molecular weight shown in examples which will be described later is a value obtained by performing polystyrene conversion of a value measured under the following measurement conditions, unless otherwise noted.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In a case of adjusting the 1-bromonaphthalene contact angle measured regarding the surface of the magnetic layer by using the nitrogen-containing polymer, the content of the nitrogen-containing polymer in the magnetic layer is preferably equal to or greater than 0.5 parts by mass and more preferably equal to or greater than 1.0 parts by mass with respect to 100.0 parts by mass of ferromagnetic powder. From a viewpoint of high-density recording, the content of other components in the magnetic layer is preferably relatively low, in order to increase a filling percentage of the ferromagnetic powder. From this viewpoint, the content of the nitrogen-containing polymer in the magnetic layer is preferably equal to or smaller than 5.00 parts by mass, more preferably equal to or smaller than 40.0 parts by mass, even more preferably equal to or smaller than 30.0 parts by mass, still more preferably equal to or smaller than 20.0 parts by mass, and still even more preferably equal to or smaller than 15.0 parts by mass, with respect to 100.0 parts by mass of ferromagnetic powder.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic powder and other powder is an average particle size obtained by the method described above, unless otherwise noted. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more components selected from the group consisting of fatty acid and fatty acid amide, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight.

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antifungal agent, an antistatic agent, an antioxidant, and carbon black.

As the additives, non-magnetic powder can also be used as an example. One aspect of the non-magnetic powder is non-magnetic powder (hereinafter, referred to as an "abrasive") which can function as an abrasive. The magnetic layer including the abrasive can include a dispersing agent disclosed in paragraphs 0012 to 0022 of JP2013-131285A, in order to improve dispersibility of the abrasive. For the abrasive, descriptions disclosed in paragraphs 0023 and 0024 of JP2013-131285A can also be referred to.

One aspect of the non-magnetic powder is a non-magnetic filler (hereinafter, referred to as a "projection formation agent") which can function as a projection formation agent which forms projections suitably protruded from the surface of the magnetic layer. As the projection formation agent, inorganic oxide powder or inorganic oxide colloidal particles can be used. In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. For the projection formation agent, paragraphs 0013 to 0028 of JP2011-048878A can be referred to. The average particle size of colloidal silica (silica colloidal particles) shown in examples which will be described later is a value obtained by a method disclosed in a paragraph 0015 of JP2011-048878A as a measurement method of an average particle diameter, and a coefficient of variation shown in examples which will be described later is a value obtained by a method disclosed in the same paragraph of JP2011-048878A. A sphericity shown in examples which will be described later is a value obtained by a method disclosed in a paragraph 0020 of JP2011-048878A as a measurement method of a circularity. In addition, in another aspect, the projection formation agent is preferably carbon black.

Center Line Average Surface Roughness Ra Measured Regarding Surface of Magnetic Layer Increasing a surface smoothness of the magnetic layer in the magnetic tape causes improvement of electromagnetic conversion characteristics. Regarding the surface smoothness of the magnetic layer, the center line average surface roughness Ra measured regarding the surface of the magnetic layer can be an index. In the invention and the specification, the center line average surface roughness Ra measured regarding the surface of the magnetic layer of the magnetic tape is a value measured with an atomic force microscope (AFM) in a region having an area of 40 μm×40 μm. As an example of the measurement conditions, the following measurement conditions can be used. The center line average surface roughness Ra shown in examples which will be described later is a value obtained by the measurement under the following measurement conditions.

The measurement is performed regarding the region of 40 μm×40 μm of the area of the surface of the magnetic layer of the magnetic tape with an AFM (Nanoscope 4 manufactured by Veeco Instruments, Inc.). A scan speed (probe movement speed) is set as 40 μm/sec and a resolution is set as 512 pixel×512 pixel.

In one aspect, the center line average surface roughness Ra measured regarding the surface of the magnetic layer of the magnetic tape is preferably equal to or smaller than 2.8 nm, more preferably equal to or smaller than 2.5 nm, even more preferably equal to or smaller than 2.3 nm, and still more preferably equal to or smaller than 2.0 nm, from a viewpoint of improving electromagnetic conversion characteristics. However, according to the studies of the inventors, it is found that, in a case where the center line average surface roughness Ra measured regarding the surface of the magnetic layer is equal to or smaller than 2.5 nm and any measures are not prepared, a decrease in resistance value of the TMR head tends to occur even more significantly. However, even a significant decrease in resistance value of the TMR head occurring in a case where the Ra is equal to or smaller than 2.5 nm can be prevented, in a case of the magnetic tape device according to one aspect of the invention. In addition, the center line average surface roughness Ra measured regarding the surface of the magnetic layer can be equal to or greater than 1.2 nm or equal to or greater than 1.3 nm. From a viewpoint of improving electromagnetic conversion characteristics, a low value of the Ra is preferable, and thus, the Ra may be lower than the values described above.

The surface smoothness of the magnetic layer, that is, the center line average surface roughness Ra measured regarding the surface of the magnetic layer can be controlled by a well-known method. For example, the surface smoothness of the magnetic layer can be controlled by adjusting a size of various powder (for example, ferromagnetic powder, non-magnetic powder which may be arbitrarily included, and the like) included in the magnetic layer or manufacturing conditions of the magnetic tape. In addition, by performing surface treatment of the surface of the magnetic layer, it is also possible to increase surface smoothness of the magnetic layer (that is, increase a value of the center line average surface roughness Ra). For example, as the surface treatment of the surface of the magnetic layer, polishing treatment using polishing means disclosed in JP1993-62174A (JP-H05-62174A) can be used. For such polishing treatment, descriptions disclosed in paragraphs 0005 to 0032 and all drawings of JP1993-62174A (JP-H05-62174A) can be referred to.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.0 to 6.0 μm.

A thickness of the magnetic layer is preferably equal to or smaller than 0.15 μm and more preferably equal to or smaller than 0.1 μm, from a viewpoint of realization of high-density recording required in recent years. The thickness of the magnetic layer is even more preferably 0.01 to 0.1 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 μm and is preferably 0.1 to 1.0 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.8 μm, more preferably equal to or smaller than 1.5 μm, and even more preferably equal to or smaller than 1.1 μm, from a viewpoint of thinning the magnetic tape. According to the studies of the inventors, it is found that, in a case where the total thickness of the magnetic layer and the non-magnetic layer is equal to or smaller than 1.1 μm and any measures are not prepared, a decrease in resistance value of the TMR head tends to occur even more significantly. However, even a significant decrease in resistance value of the TMR head occurring in a case where the total thickness of the magnetic layer and the non-magnetic layer is equal to or smaller than 1.1 μm can be prevented, in a case of the magnetic tape device according to one aspect of the invention. In addition, the total thickness of the magnetic layer and the non-magnetic layer can be, for example, equal to or greater than 0.1 μm or equal to or greater than 0.2 μm.

A thickness of the back coating layer is preferably equal to or smaller than 0.9 μm and even more preferably 0.1 to 0.7 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. The magnetic layer forming composition is preferably prepared by performing separate dispersion and preparing each of a dispersion liquid including ferromagnetic powder (magnetic solution), a dispersion liquid including an abrasive (abrasive liquid), and a dispersion liquid including a projection formation agent (projection forming agent liquid), and then, mixing other components such as a lubricant at the same time or in order. Some or all of a lubricant, a curing agent, and a solvent may be added to a mixture obtained by mixing the magnetic solution, the abrasive liquid, and the projection forming agent liquid. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0069 of JP2010-231843A can be referred to. For the surface treatment of the surface of the magnetic layer, descriptions disclosed in JP1993-62174A (JP-H05-62174A) can be referred to, as described above.

Formation of Servo Pattern

A servo pattern is formed in the magnetic layer by magnetizing a specific position of the magnetic layer with a servo pattern recording head (also referred to as a "servo write head"). A well-known technology regarding a servo pattern of the magnetic layer of the magnetic tape which is well known can be applied for the shapes of the servo pattern with which the head tracking servo can be performed and the disposition thereof in the magnetic layer. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals) to the magnetic tape, the magnetic tape is drawn from the magnetic tape cartridge and wound around the reel on the drive side. A servo head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the servo head comes into contact with and slides on the surface of the magnetic layer of the magnetic tape, and accordingly, the reading of the servo pattern is performed by the servo head. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Servo Head

The magnetic tape device includes the TMR head as the servo head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a servo pattern reading element for reading a servo pattern formed in the magnetic layer of the magnetic tape. By converting the detected change in resistance value into a change in voltage, the servo pattern can be read (servo signal can be reproduced).

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the servo pattern can be read. For an example of the configuration of the TMR head, a description disclosed in FIG. 1 of JP2004-185676A can be referred to, for example. However, there is no limitation to the aspect shown in the drawing.

FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in electric resistance causes a decrease in accuracy of the head position controlling of the head tracking servo. This decrease in resistance value of the TMR head can be prevented by using a magnetic tape in which 1-bromonaphthalene contact angle measured regarding the surface of the magnetic layer is 48.0° to 53.0° as the magnetic tape in which the magnetic layer includes a servo pattern.

The servo head is a magnetic head including at least the TMR element as a servo pattern reading element. The servo head may include or may not include a reproducing element for reproducing information recorded on the magnetic tape. That is, the servo head and the reproducing head may be one magnetic head or separated magnetic heads. The same applies to a recording element for performing the recording of information in the magnetic tape.

Magnetic Tape Transportation Speed

The magnetic tape transportation speed of the magnetic tape device is equal to or lower than 18 m/sec. Normally, the magnetic tape transportation speed is set in a control unit of the magnetic tape device. It is desired that the magnetic tape is transported at a low speed in the magnetic tape device, in order to prevent a deterioration of recording and reproducing characteristics. But, in a case where the magnetic tape transportation speed is equal to or lower than 18 m/sec in the magnetic tape device including the TMR head as a servo head, a decrease in resistance value of the TMR head used as the servo head particularly significantly occurs. In the magnetic tape device according to one aspect of the invention, such a decrease in resistance value can be prevented by using a magnetic tape in which 1-bromonaphthalene contact angle measured regarding the surface of the magnetic layer is 48.0° to 53.0°. The magnetic tape transportation speed is equal to or lower than 18 m/sec or may be equal to or lower than 15 m/sec or equal to or lower than 10 m/sec. The magnetic tape transportation speed can be, for example, equal to or higher than 1 m/sec.

Head Tracking Servo Method

One aspect of the invention relates to a head tracking servo method including: reading a servo pattern of a magnetic layer of a magnetic tape by a servo head in a magnetic tape device, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, and a contact angle with respect to 1-bromonaphthalene measured regarding a surface of the magnetic layer is 48.0° to 53.0°. The reading of the servo pattern is performed by bringing the magnetic tape into contact with the servo head allowing sliding while transporting (causing running of) the magnetic tape. The details of the magnetic tape and the servo head used in the head tracking servo method are as the descriptions regarding the magnetic tape device according to one aspect of the invention.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed in a magnetic layer, and a position of a servo head is recognized by an interval of time in a case where the servo head has read the two servo patterns having different shapes and an interval of time in a case where the servo head has read two servo patterns having the same shapes. The position of the magnetic head of the magnetic tape in the width direction is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
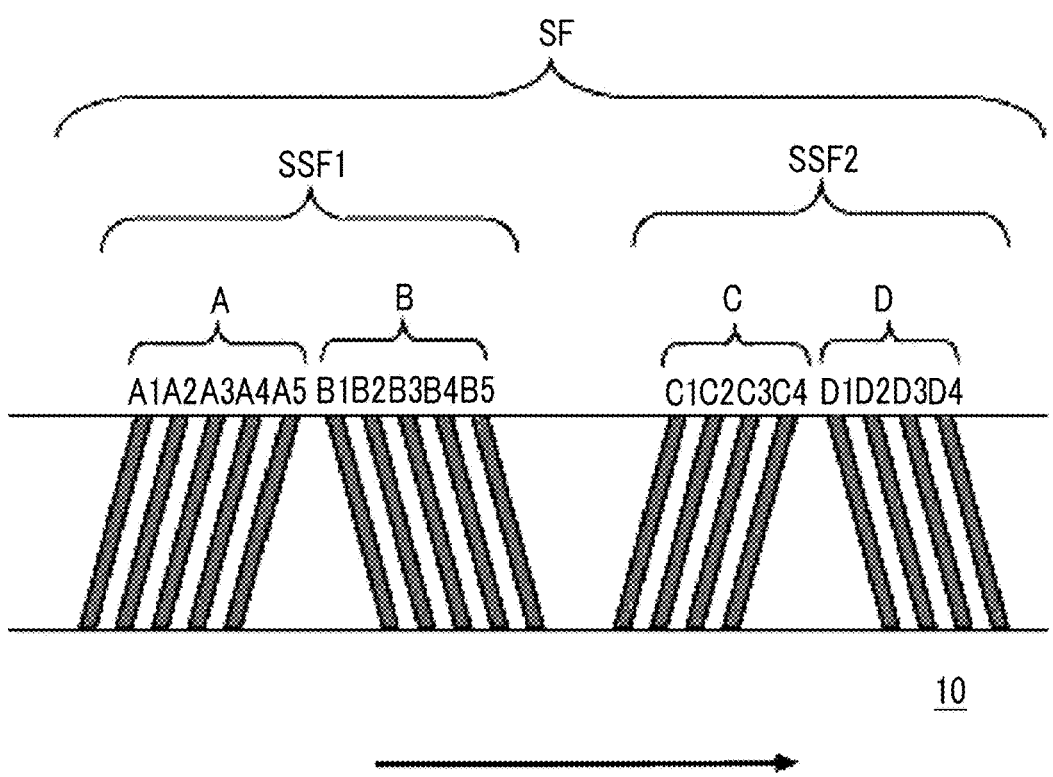
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 1 and 2, but also to entire timing-based servo systems.

For the details of the head tracking servo in the timing-based servo system, well-known technologies such as technologies disclosed in U.S. Pat. No. 5,689,384A, U.S. Pat. No. 6,542,325B, and U.S. Pat. No. 7,876,521B can be referred to, for example. In addition, for the details of the head tracking servo in the amplitude-based servo system, well-known technologies disclosed in U.S. Pat. No. 5,426,543A and U.S. Pat. No. 5,898,533A can be referred to, for example.

According to one aspect of the invention, a magnetic tape used in a magnetic tape device in which a TMR head is used as a servo head and a magnetic tape transportation speed in a case of reading a servo pattern of a magnetic layer of the magnetic tape is equal to or lower than 18 m/sec, the magnetic tape including: a magnetic layer including ferromagnetic powder and a binding agent on a non-magnetic support, the magnetic layer includes a servo pattern, and a contact angle with respect to 1-bromonaphthalene measured regarding a surface of the magnetic layer is 48.0° to 53.0° is also provided. The details of the magnetic tape is also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted.

As a 1-bromonaphthalene contact angle adjusting component A described below, a polyalkyleneimine-based polymer synthesized by a method disclosed in paragraphs 0115 to 0124 of JP2016-51493A was used. As a 1-bromonaphthalene contact angle adjusting component B described below, a commercially available amine-based polymer (DISPERBYK-102 manufactured by BYK Additives & Instruments) was used.

Example 1

List of each layer forming composition is shown below.
Magnetic Layer Forming Composition
Magnetic Solution
Ferromagnetic hexagonal barium ferrite powder: 100.0 parts
  (Hc: 196 kA/m (2,460 Oe), average particle size (average diameter) of 24 nm)
Oleic acid: 2.0 parts
A vinyl chloride copolymer (MR-104 manufactured by Zeon Corporation): 10.0 parts
$SO_3Na$ group-containing polyurethane resin: 4.0 parts
  (Weight-average molecular weight: 70,000, $SO_3Na$ group: 0.07 meq/g)
1-Bromonaphthalene contact angle adjusting component (type: see Table 1): see Table 1
Methyl ethyl ketone: 150.0 parts
Cyclohexanone: 150.0 parts
Abrasive Liquid
α-alumina (Brunauer-Emmett-Teller (BET) specific surface area: 19 $m^2/g$, sphericity: 1.4): 6.0 parts
$SO_3Na$ group-containing polyurethane resin
  (Weight-average molecular weight: 70,000, $SO_3Na$ group: 0.1 Meq/g): 0.6 parts
2,3-Dihydroxynaphthalene: 0.6 parts
Cyclohexanone: 23.0 parts
Projection Forming Agent Liquid
Colloidal silica (average particle size: see Table 1, coefficient of variation: 7%, sphericity: 1.03): 2.0 parts
Methyl ethyl ketone: 8.0 parts
Other Components
Stearic acid: see Table 1
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Nippon Polyurethane Industry Co., Ltd.): 3.0 parts
Non-Magnetic Layer Forming Composition
Carbon black (average particle size: 16 nm, dibutyl phthalate (DBP) oil absorption: 74 $cm^3/100$ g): 100.0 parts
Trioctylamine: 4.0 parts
A vinyl chloride copolymer (MR-104 manufactured by Zeon Corporation): 19.0 parts
$SO_3Na$ group-containing polyurethane resin (Weight-average molecular weight: 50,000, $SO_3Na$ group: 0.07 meq/g): 12.0 parts
Methyl ethyl ketone: 370.0 parts
Cyclohexanone: 370.0 parts
Stearic acid: 2.0 parts
Stearic acid amide: 0.3 parts
Butyl stearate: 2.0 parts
Back Coating Layer Forming Composition
Red oxide (average particle size: 0.15 μm, average acicular ratio: 7, BET specific surface area: 52 $m^2/g$): 80.0 parts
Carbon black (average particle size: 16 nm, DBP oil absorption: 74 $cm^3/100$ g): 20.0 parts
Phenylphosphonic acid: 3.0 parts
A vinyl chloride copolymer (MR-104 manufactured by Zeon Corporation): 12.0 parts
$SO_3Na$ group-containing polyurethane resin (Weight-average molecular weight: 50,000, $SO_3Na$ group: 0.07 meq/g): 8.0 parts
α-alumina (BET specific surface area: 17 $m^2/g$): 5.0 parts
Methyl ethyl ketone: 370.0 parts
Cyclohexanone: 370.0 parts
Stearic acid: see Table 1
Stearic acid amide: 0.3 parts
Butyl stearate: 2.0 parts
Polyisocyanate (CORONATE L manufactured by Nippon Polyurethane Industry Co., Ltd.): 5.0 parts 1. Manufacturing of Magnetic Tape Preparation of Magnetic Layer Forming Composition The magnetic layer forming composition was prepared by the following method.

Each component of the magnetic solution was kneaded and diluted by an open kneader, and subjected to a dispersion process of 30 passes, with a transverse beads mill dispersing device and zirconia ($ZrO_2$) beads (hereinafter, referred to as "Zr beads") having a bead diameter of 0.1 mm by setting a bead filling percentage as 80 volume %, a circumferential speed of rotor distal end as 10 m/sec, and a retention time for 1 pass as 2 minutes.

The components of the abrasive liquid were mixed with each other and put in a transverse beads mill dispersing device together with Zr beads having a bead diameter of 0.3 mm, bead volume/(abrasive liquid volume+bead volume) was adjusted to be 80%, and beads mill dispersion process was performed for 120 minutes. Liquid after the process was extracted and subjected to an ultrasonic dispersion filtering process was performed with a flow-type ultrasonic dispersion filtering device, and the abrasive liquid was obtained.

The magnetic solution, the projection formation agent, the abrasive liquid, and other components were introduced into a dissolver stirring device, and were stirred at a circumferential speed of 10 m/sec for 30 minutes. After that, the treatment of 3 passes was performed with a flow-type ultrasonic dispersion device at a flow rate of 7.5 kg/min, and then, a magnetic layer forming composition was prepared by performing filtering with a filter having a hole diameter of 1 μm.

Preparation of Non-Magnetic Layer Forming Composition

The non-magnetic layer forming composition was prepared by the following method.

The components excluding a lubricant (stearic acid, stearic acid amide, and butyl stearate) were kneaded and diluted by an open kneader, and subjected to a dispersion process with a transverse beads mill dispersing device. The lubricant (stearic acid, stearic acid amide, and butyl stearate) was added to the obtained dispersion liquid and stirred and mixed with a dissolver stirring device, and the non-magnetic layer forming composition was prepared.

Preparation of Back Coating Layer Forming Composition

The back coating layer forming composition was prepared by the following method. The components excluding polyisocyanate and lubricant (stearic acid, stearic acid amide, and butyl stearate) were introduced into a dissolver stirring device, and were stirred at a circumferential speed of 10 m/sec for 30 minutes. After that, the dispersion process was performed with a transverse beads mill dispersing device. The polyisocyanate and lubricant (stearic acid, stearic acid amide, and butyl stearate) were added to the obtained dispersion liquid and stirred and mixed with a dissolver stirring device, and the back coating layer forming composition was prepared.

Manufacturing of Magnetic Tape

The non-magnetic layer forming composition was applied to one surface of a non-magnetic support (polyamide support) having a thickness of 4.0 μm and dried so that the thickness after the drying becomes a thickness shown in Table 1, and then, the back coating layer forming composition was applied to the surface of the non-magnetic support on a side opposite to the surface where the non-magnetic layer was formed, and dried, so that the thickness after the drying becomes 0.50 μm. The non-magnetic support which was temporarily wound around a wind roll was heated in an environment of an atmosphere temperature of 70° C. for 36 hours.

The magnetic layer forming composition was applied onto the non-magnetic layer after the heating and dried so that the thickness after the drying becomes a thickness shown in Table 1.

After that, the surface smoothing treatment (calender process) was performed with a calender roll configured of only a metal roll, at a calender process speed of 40 m/min, linear pressure of 300 kg/cm (294 kN/m), and a calender temperature (surface temperature of a calender roll) shown in Table 1. Then, the thermal treatment was performed in the environment of the atmosphere temperature of 70° C. for 36 hours. After the thermal treatment, the slitting was performed so as to have a width of ½ inches (0.0127 meters).

Then, surface treatment (aspect shown in FIGS. 1 to 3 of JP1993-62174A (JP-H05-62174A)) was performed by using a diamond wheel disclosed in JP1993-62174A (JP-H05-62174A), and a magnetic tape for forming a servo pattern on the magnetic layer was manufactured.

In a state where the magnetic layer of the manufactured magnetic tape was demagnetized, servo patterns having disposition and shapes according to the LTO Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer of the manufactured magnetic tape was acquired by the following method. It was confirmed that the thicknesses of the formed non-magnetic layer and the magnetic layer were the thicknesses shown in Table 1 and the thicknesses of the back coating layer and the non-magnetic support were the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation described below, and the other part was used in order to measure a resistance value of the TMR head which will be described later.

2. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.), and a center line average surface roughness Ra was acquired. A scan speed (probe movement speed) was set as 40 μm/sec and a resolution was set as 512 pixel×512 pixel.

(2) 1-Bromonaphthalene Contact Angle Measured Regarding Surface of Magnetic Layer The 1-bromonaphthalene contact angle was measured regarding the surface of the magnetic layer by the following method by using a contact angle measuring device (contact angle measuring device Drop Master 700 manufactured by Kyowa Interface Science Co., Ltd.).

A tape sample obtained by cutting a certain length of the magnetic tape wound in a roll shape from an edge of the roll was placed on slide glass so that the surface of the back coating layer comes into contact with the surface of the slide glass. 2.0 μL of a liquid for measurement (1-bromonaphthalene) was dropped on the surface of the tape sample (surface of the magnetic layer), formation of stable liquid droplet from the dropped liquid was visually confirmed, a liquid droplet image was analyzed by contact angle analysis software FAMAS attached to the contact angle measurement device, and a contact angle formed by the tape sample and the liquid droplet was measured. The calculation of the contact angle was performed by a θ/2 method, an average value measured regarding 1 sample six times was set as the 1-bromonaphthalene contact angle. The measurement was performed in the environment of an atmosphere temperature of 25° C. and relative humidity of 25%, and the contact angle was obtained under the following analysis conditions.

Method: liquid droplet method (θ/2 method)

Droplet deposition confirmation: automatic

Droplet deposition confirmation line (distance from needle tip): 50 dot

Algorithm: automatic

Image mode: frame

Threshold level: automatic

3. Measurement of Resistance Value of Servo Head

The servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as a value shown in Table 1. The servo head was moved in a width direction of the magnetic tape by 2.5 μm for 1 pass, a resistance value (electric resistance) of the servo head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 1.

Examples 2 to 8 and Comparative Examples 1 to 15

1. Manufacturing of Magnetic Tape

A magnetic tape was manufactured in the same manner as in Example 1, except that various conditions shown in Table 1 were changed as shown in Table 1.

2. Evaluation of Physical Properties of Magnetic Tape

Various physical properties of the manufactured magnetic tape were evaluated in the same manner as in Example 1.

3. Measurement of Resistance Value of Servo Head

A resistance value of the servo head was measured by the same method as that in Example 1, by using the manufactured magnetic tape. The magnetic tape transportation speed at the time of the reproducing was set as a value shown in Table 1. In Examples 2 to 8 and Comparative Examples 7 to 15, the TMR head which was the same as that in Example 1 was used as a servo head. In Comparative Examples 1 to 6, a commercially available spin valve type GMR head (element width of 70 nm) was used as a servo head. This GMR head was a magnetic head having a CIP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results of the evaluations described above are shown in Table 1.

TABLE 1

|  | Example 1 | Example 2 | Example 3 | Example 4 |
|---|---|---|---|---|
| Magnetic layer thickness | 0.1 μm | 0.1 μm | 0.1 μm | 0.1 μm |
| Non-magnetic layer thickness | 1.5 μm | 1.0 μm | 1.0 μm | 0.5 μm |
| Total thickness of magnetic layer + non-magnetic layer | 1.6 μm | 1.1 μm | 1.1 μm | 0.6 μm |
| Colloidal silica average particle size | 120 nm | 80 nm | 80 nm | 80 nm |
| Calender temperature | 80° C. | 90° C. | 90° C. | 90° C. |
| Center line average surface roughness Ra | 2.8 nm | 2.0 nm | 2.0 nm | 2.0 nm |
| Magnetic layer forming composition    Kind | A | A | B | A |
| contact angle adjusting agent    Additive amount/part | 10.0 | 10.0 | 10.0 | 15.0 |
| Magnetic layer forming composition stearic acid    Additive amount/part | 3.0 | 3.0 | 3.0 | 3.0 |
| Back coating layer forming composition stearic acid    Additive amount/part | 1.0 | 1.0 | 1.0 | 1.0 |
| 1-Bromonaphthalene contact angle | 48.2 | 48.2 | 51.3 | 51.2 |
| Servo head | TMR | TMR | TMR | TMR |
| Magnetic tape transportation speed | 18 m/sec | 18 m/sec | 18 m/sec | 18 m/sec |
| Number of times of occurrence of decrease in resistance value (times) | 0 | 0 | 0 | 0 |
| Rate of decrease in resistance value (%) | 6 | 9 | 8 | 17 |
|  | Example 5 | Example 6 | Example 7 | Example 8 |
| Magnetic layer thickness | 0.1 μm | 0.1 μm | 0.1 μm | 0.1 μm |
| Non-magnetic layer thickness | 0.5 μm | 0.3 μm | 0.3 μm | 0.3 μm |
| Total thickness of magnetic layer + non-magnetic layer | 0.6 μm | 0.4 μm | 0.4 μm | 0.4 μm |
| Colloidal silica average particle size | 80 nm | 40 nm | 40 nm | 40 nm |
| Calender temperature | 90° C. | 110° C. | 110° C. | 110° C. |
| Center line average surface roughness Ra | 2.0 nm | 1.5 nm | 1.5 nm | 1.5 nm |
| Magnetic layer forming composition    Kind | A | A | A | A |
| contact angle adjusting agent    Additive amount/part | 15.0 | 15.0 | 15.0 | 15.0 |
| Magnetic layer forming composition stearic acid    Additive amount/part | 3.0 | 3.0 | 3.0 | 3.0 |
| Back coating layer forming composition stearic acid    Additive amount/part | 1.0 | 1.0 | 1.0 | 1.0 |
| 1-Bromonaphthalene contact angle | 52.5 | 52.5 | 52.5 | 52.5 |
| Servo head | TMR | TMR | TMR | TMR |
| Magnetic tape transportation speed | 18 m/sec | 18 m/sec | 10 m/sec | 1 m/sec |
| Number of times of occurrence of decrease in resistance value (times) | 0 | 0 | 0 | 0 |
| Rate of decrease in resistance value (%) | 6 | 8 | 9 | 22 |

TABLE 1-continued

|  | Comparative Example 1 | Comparative Example 2 | Comparative Example 3 | Comparative Example 4 |
|---|---|---|---|---|
| Magnetic layer thickness | 0.1 μm | 0.1 μm | 0.1 μm | 0.1 μm |
| Non-magnetic layer thickness | 1.5 μm | 1.0 μm | 1.0 μm | 0.5 μm |
| Total thickness of magnetic layer + non-magnetic layer | 1.6 μm | 1.1 μm | 1.1 μm | 0.6 μm |
| Colloidal silica average particle size | 120 nm | 120 nm | 80 nm | 80 nm |
| Calender temperature | 80° C. | 90° C. | 90° C. | 80° C. |
| Center line average surface roughness Ra | 2.8 nm | 2.5 nm | 2.0 nm | 2.5 nm |
| Magnetic layer forming composition contact angle adjusting agent — Kind | None | None | None | None |
| Magnetic layer forming composition contact angle adjusting agent — Additive amount/part | — | — | — | — |
| Magnetic layer forming composition stearic acid — Additive amount/part | 2.0 | 2.0 | 2.0 | 2.0 |
| Back coating layer forming composition stearic acid — Additive amount/part | 2.0 | 2.0 | 2.0 | 2.0 |
| 1-Bromonaphthalene contact angle | 42.0 | 42.0 | 42.0 | 42.0 |
| Servo head | GMR | GMR | GMR | GMR |
| Magnetic tape transportation speed | 18 m/sec | 18 m/sec | 18 m/sec | 18 m/sec |
| Number of times of occurrence of decrease in resistance value (times) | 0 | 0 | 0 | 0 |
| Rate of decrease in resistance value (%) | 0 | 0 | 0 | 0 |

|  | Comparative Example 5 | Comparative Example 6 | Comparative Example 7 | Comparative Example 8 |
|---|---|---|---|---|
| Magnetic layer thickness | 0.1 μm | 0.1 μm | 0.1 μm | 0.1 μm |
| Non-magnetic layer thickness | 0.5 μm | 0.5 μm | 1.5 μm | 1.5 μm |
| Total thickness of magnetic layer + non-magnetic layer | 0.6 μm | 0.6 μm | 1.6 μm | 1.6 μm |
| Colloidal silica average particle size | 80 nm | 80 nm | 120 nm | 120 nm |
| Calender temperature | 90° C. | 90° C. | 80° C. | 80° C. |
| Center line average surface roughness Ra | 2.0 nm | 2.0 nm | 2.8 nm | 2.8 nm |
| Magnetic layer forming composition contact angle adjusting agent — Kind | None | None | None | None |
| Magnetic layer forming composition contact angle adjusting agent — Additive amount/part | — | — | — | — |
| Magnetic layer forming composition stearic acid — Additive amount/part | 2.0 | 2.0 | 2.0 | 2.0 |
| Back coating layer forming composition stearic acid — Additive amount/part | 2.0 | 2.0 | 2.0 | 2.0 |
| 1-Bromonaphthalene contact angle | 42.0 | 42.0 | 42.0 | 42.0 |
| Servo head | GMR | GMR | TMR | TMR |
| Magnetic tape transportation speed | 18 m/sec | 1 m/sec | 19 m/sec | 18 m/sec |
| Number of times of occurrence of decrease in resistance value (times) | 0 | 0 | 0 | 1 |
| Rate of decrease in resistance value (%) | 0 | 0 | 0 | — |

|  | Comparative Example 9 | Comparative Example 10 | Comparative Example 11 | Comparative Example 12 |
|---|---|---|---|---|
| Magnetic layer thickness | 0.1 μm | 0.1 μm | 0.1 μm | 0.1 μm |
| Non-magnetic layer thickness | 1.0 μm | 1.0 μm | 0.5 μm | 0.5 μm |
| Total thickness of magnetic layer + non-magnetic layer | 1.1 μm | 1.1 μm | 0.6 μm | 0.6 μm |
| Colloidal silica average particle size | 120 nm | 80 nm | 80 nm | 80 nm |
| Calender temperature | 90° C. | 90° C. | 80° C. | 90° C. |
| Center line average surface roughness Ra | 2.5 nm | 2.0 nm | 2.5 nm | 2.0 nm |
| Magnetic layer forming composition contact angle adjusting agent — Kind | None | None | None | None |
| Magnetic layer forming composition contact angle adjusting agent — Additive amount/part | — | — | — | — |
| Magnetic layer forming composition stearic acid — Additive amount/part | 2.0 | 2.0 | 2.0 | 2.0 |
| Back coating layer forming composition stearic acid — Additive amount/part | 2.0 | 2.0 | 2.0 | 2.0 |
| 1-Bromonaphthalene contact angle | 42.0 | 42.0 | 42.0 | 42.0 |
| Servo head | TMR | TMR | TMR | TMR |
| Magnetic tape transportation speed | 18 m/sec | 18 m/sec | 18 m/sec | 18 m/sec |
| Number of times of occurrence of decrease in resistance value (times) | 3 | 7 | 9 | 10 |
| Rate of decrease in resistance value (%) | — | — | — | — |

|  | Comparative Example 13 | Comparative Example 14 | Comparative Example 15 |
|---|---|---|---|
| Magnetic layer thickness | 0.1 μm | 0.1 μm | 0.1 μm |
| Non-magnetic layer thickness | 0.3 μm | 1.0 μm | 1.0 μm |
| Total thickness of magnetic layer + non-magnetic layer | 0.4 μm | 1.1 μm | 1.1 μm |
| Colloidal silica average particle size | 40 nm | 80 nm | 80 nm |

TABLE 1-continued

| | | | | |
|---|---|---|---|---|
| Calender temperature | | 110° C. | 90° C. | 90° C. |
| Center line average surface roughness Ra | | 1.5 nm | 2.0 nm | 2.0 nm |
| Magnetic layer forming composition | Kind | None | A | A |
| contact angle adjusting agent | Additive amount/part | — | 10.0 | 20.0 |
| Magnetic layer forming composition stearic acid | Additive amount/part | 2.0 | 3.0 | 3.0 |
| Back coating layer forming composition stearic acid | Additivepart amount/ | 2.0 | 1.0 | 1.0 |
| 1-Bromonaphthalene contact angle | | 42.0 | 47.8 | 53.8 |
| Servo head | | TMR | TMR | TMR |
| Magnetic tape transportation speed | | 18 m/sec | 18 m/sec | 18 m/sec |
| Number of times of occurrence of decrease in resistance value (times) | | 10 | 6 | 1 |
| Rate of decrease in resistance value (%) | | — | — | — |

As shown in Table 1, in Comparative Examples 1 to 6 in which the GMR head was used as a servo head, the magnetic tape transportation speed was equal to or lower than 18 m/sec and, even in a case where the 1-bromonaphthalene contact angle measured regarding the surface of the magnetic layer of the magnetic tape was not 48.0° to 53.0°, a significant decrease in resistance value of the servo head was not observed. In addition, in Comparative Example 7 in which the magnetic tape transportation speed exceeded 18 m/sec although the TMR head was used as a servo head, even in a case where the 1-bromonaphthalene contact angle measured regarding the surface of the magnetic layer of the magnetic tape was not 48.0° to 53.0°, a significant decrease in resistance value of the servo head was not observed. On the other hand, in Comparative Examples 8 to 15 in which the TMR head was used as a servo head, the magnetic tape transportation speed was equal to or lower than 18 m/sec, and the 1-bromonaphthalene contact angle measured regarding the surface of the magnetic layer of the magnetic tape was not 48.0° to 53.0°, a significant decrease in resistance value of the servo head occurred.

With respect to this, in Examples 1 to 8 in which the TMR head was used as a servo head, the magnetic tape transportation speed was equal to or lower than 18 m/sec, and the 1-bromonaphthalene contact angle measured regarding the surface of the magnetic layer of the magnetic tape was 48.0° to 53.0°, it was possible to prevent a significant decrease in resistance value of the servo head (TMR head).

One aspect of the invention is effective for usage of magnetic recording for which high-sensitivity reproducing of information recorded with high density is desired.

What is claimed is:

1. A magnetic tape device comprising:
a magnetic tape; and
a servo head,
wherein a magnetic tape transportation speed of the magnetic tape device is equal to or lower than 18 m/sec,
the servo head is a magnetic head including a tunnel magnetoresistance effect type element as a servo pattern reading element,
the magnetic tape includes a non-magnetic support, and a magnetic layer including ferromagnetic powder and a binding agent on the non-magnetic support,
the magnetic layer includes a servo pattern, and
a contact angle with respect to 1-bromonaphthalene measured regarding a surface of the magnetic layer is 48.0° to 53.0°.

2. The magnetic tape device according to claim 1,
wherein the contact angle with respect to 1-bromonaphthalene measured regarding the surface of the magnetic layer is 48.2° to 52.5°.

3. The magnetic tape device according to claim 1,
wherein a center line average surface roughness Ra measured regarding a surface of the magnetic layer is equal to or smaller than 2.8 nm.

4. The magnetic tape device according to claim 3,
wherein the center line average surface roughness Ra is equal to or smaller than 2.5 nm.

5. The magnetic tape device according to claim 1,
wherein the magnetic tape includes a non-magnetic layer including non-magnetic powder and a binding agent between the non-magnetic support and the magnetic layer, and
a total thickness of the magnetic layer and the non-magnetic layer is equal to or smaller than 1.8 μm.

6. The magnetic tape device according to claim 5,
wherein the total thickness of the magnetic layer and the non-magnetic layer is equal to or smaller than 1.1 μm.

7. A head tracking servo method comprising:
reading a servo pattern of a magnetic layer of a magnetic tape by a servo head in a magnetic tape device,
wherein a magnetic tape transportation speed of the magnetic tape device is equal to or lower than 18 m/sec,
the servo head is a magnetic head including a tunnel magnetoresistance effect type element as a servo pattern reading element,
the magnetic tape includes a non-magnetic support, and a magnetic layer including ferromagnetic powder and a binding agent on the non-magnetic support,
the magnetic layer includes the servo pattern, and
a contact angle with respect to 1-bromonaphthalene measured regarding a surface of the magnetic layer is 48.0° to 53.0°.

8. The head tracking servo method according to claim 7,
wherein the contact angle with respect to 1-bromonaphthalene measured regarding the surface of the magnetic layer is 48.2° to 52.5°.

9. The head tracking servo method according to claim 7,
wherein a center line average surface roughness Ra measured regarding a surface of the magnetic layer is equal to or smaller than 2.8 nm.

10. The head tracking servo method according to claim 9,
wherein the center line average surface roughness Ra is equal to or smaller than 2.5 nm.

11. The head tracking servo method according to claim 7,
wherein the magnetic tape includes a non-magnetic layer including non-magnetic powder and a binding agent between the non-magnetic support and the magnetic layer, and a total thickness of the magnetic layer and the non-magnetic layer is equal to or smaller than 1.8 μm.

12. The head tracking servo method according to claim 11, wherein the total thickness of the magnetic layer and the non-magnetic layer is equal to or smaller than 1.1 μm.

* * * * *